United States Patent
Mehra et al.

(10) Patent No.: US 9,830,356 B2
(45) Date of Patent: Nov. 28, 2017

(54) SYSTEMS AND/OR METHODS FOR ENABLING STORAGE TIER SELECTION AND USAGE AT A GRANULAR LEVEL

(71) Applicant: Software AG USA, Inc., Reston, VA (US)

(72) Inventors: Gagan Mehra, Oakland, CA (US); Foram Gandhi, Fremont, CA (US); Steve Yellenberg, Los Gatos, CA (US)

(73) Assignee: SOFTWARE AG USA, INC., Reston, VA (US)

( * ) Notice: Subject to any disclaimer, the term of this patent is extended or adjusted under 35 U.S.C. 154(b) by 529 days.

(21) Appl. No.: 14/333,740

(22) Filed: Jul. 17, 2014

(65) Prior Publication Data

US 2016/0019144 A1    Jan. 21, 2016

(51) Int. Cl.
*G06F 3/00* (2006.01)
*G06F 17/30* (2006.01)
(Continued)

(52) U.S. Cl.
CPC ...... *G06F 17/3048* (2013.01); *G06F 12/0871* (2013.01); *G06F 12/126* (2013.01);
(Continued)

(58) Field of Classification Search
None
See application file for complete search history.

(56) References Cited

U.S. PATENT DOCUMENTS

| 7,113,953 B2 | 9/2006 | Brown et al. |
| 2012/0265924 A1 | 10/2012 | Purdy et al. |

(Continued)

FOREIGN PATENT DOCUMENTS

| WO | 2011/018646 | 2/2011 |

OTHER PUBLICATIONS

"Configuring Oracle Elastic Data," Oracle.com, retrieved Jul. 17, 2014, 10 pages. http://www.oracle.com/webfolder/technetwork/tutorials/obe/fmw/coherence/coherence_3.7/obe_Coherence3.7_ed/ed.html?cid=6395&ssid=34115903566625.

(Continued)

*Primary Examiner* — Henry Tsai
*Assistant Examiner* — Aurangzeb Hassan
(74) *Attorney, Agent, or Firm* — Nixon & Vanderhye PC

(57) ABSTRACT

Certain example embodiments relate to memory management techniques that enable users to "pin" elements to particular storage tiers (e.g., RAM, SSD, HDD, tape, or the like). Once pinned, elements are not moved from tier-to-tier during application execution. A memory manager, working with at least one processor, receives requests to store and retrieve data during application execution. Each request is handled using a non-transitory computer readable storage medium (rather than a transitory computer readable storage medium), if the associated data is part of a data cache that is pinned to the non-transitory computer readable storage medium, or if the associated data itself is pinned to the non-transitory computer readable storage medium. If neither condition applies, the memory manager determines which one of the non-transitory and the transitory computer readable storage mediums should be used in handling the respective received request, and handles the request accordingly.

25 Claims, 4 Drawing Sheets

(51) Int. Cl.
*G06F 12/0871* (2016.01)
*G06F 12/126* (2016.01)
*G06F 13/38* (2006.01)
*G06F 13/10* (2006.01)
*G06F 9/44* (2006.01)

(52) U.S. Cl.
CPC .......... *G06F 9/4411* (2013.01); *G06F 13/102* (2013.01); *G06F 13/385* (2013.01)

(56) References Cited

U.S. PATENT DOCUMENTS

2014/0325363 A1* 10/2014 Fletcher .............. G06F 9/45533
715/736
2015/0293964 A1* 10/2015 Morfonios .............. H04L 43/04
707/753
2016/0357463 A1* 12/2016 Deneui ................ G06F 3/0619

OTHER PUBLICATIONS

"Hazelcast Documentation Version: 3.2.3: Frequently Asked Questions," Hazelcast.org, retrieved Jul. 17, 2014, 5 pages. http://hazelcast.org/docs/latest/manual/html/faq.html.

"Scalable, Integrated Solutions for Elastic Caching Using IBM WebSphere eXtreme Scale," IBM.com/redbooks, Feb. 2011, 164 pages. http://www.redbooks.ibm.com/redbooks/pdfs/sg247926.pdf.

\* cited by examiner

SYSTEMS AND/OR METHODS FOR ENABLING STORAGE TIER SELECTION AND USAGE AT A GRANULAR LEVEL

TECHNICAL FIELD

Certain example embodiments described herein relate to computer memory management techniques. More particularly, certain example embodiments described herein relate to systems and/or methods that enable users to "pin" elements to a particular storage tier (e.g., RAM, SSD, or the like) such that, once pinned, such elements are not moved from one tier to another during application execution.

BACKGROUND AND SUMMARY OF EXAMPLE EMBODIMENTS

The conventional wisdom in the computer architecture world is that data to be operated on should be moved into a more transitory memory, such as random access memory (RAM) or the like, whenever possible. This piece of conventional wisdom is based on a variety of factors including the facts that RAM, hardware caches, and the like, generally are "close" to the processor core that ultimately will do the work on the data and that they can be accessed much more quickly than non-transitory storage media. Moving data into memory for processing therefore is seen to increase speed, lower disk thrashing, etc.

To keep up with the ever-increasing demand for processing power and speed, hardware cache and RAM sizes have increased dramatically since the advent of the microprocessor. The desire to increase speed and microprocessor development in general also have led to instruction set optimizations, multi-level hardware cache implementations, multi-core processor technology, etc. These improvements have been beneficial and, indeed, have transformed society by making computers a facet—seen or unseen—in countless aspects of one's everyday life.

Yet none of these improvements has truly challenged the accepted fact that data should be moved into main memory before it is operated on, or the industry-wide bias towards trying to make main memory larger, e.g., for Big Memory and Big Data related applications. The reliance on these "old ways" could be problematic as the data volumes maintained in memory continue to rise and could possibly move beyond levels that are pragmatic or possible in some cases. It would be desirable to address this possible problem. Moreover, it would be desirable to take advantage of non-transitory media for tasks traditionally reserved for more transitory media (e.g., RAM, hardware caches, and the like), e.g., from cost and/or performance perspectives.

In a typical computer system, data will first be loaded into main memory and it will be swapped out to disk only if required. There are some current technologies that allow for "spill over" to disk drive devices such as, for example, virtual memory approaches. Other technologies allow for "spill over" to solid state drives (SSDs), which are data storage devices that typically use integrated circuit (IC) assemblies as memory to store data persistently. SSDs generally have no moving (mechanical) components, which helps distinguish them from traditional electromechanical magnetic disks such as hard disk drives (HDDs) that include spinning disks and movable read/write heads. Compared with electromechanical disks, SSDs are typically more resistant to physical shock, run more quietly, have lower access times/less latency, etc. In general, the characteristics of SSDs are somewhat between RAM (direct memory) storage and disk (HDD) medium. Using the Elastic Data feature of Oracle Coherence, for example, memory can spill over to an SSD device as required, increasing memory size, and returning back to core memory when usage drops. In this way, the size of the core memory becomes elastic.

The inventors have realized, however, that not all data elements are equally important to a particular application. For instance, not all data elements are equally important in a business environment. Indeed, in some cases, data that is new and/or accessed frequently might be more important to a given business or other application that is old and/or accessed less frequently. The inventors also have realized that the application programmers, business processor modelers, and/or others, oftentimes are able to identify this more important information in advance.

Certain example embodiments thus do not adopt the conventional wisdom that all data to be operated on should be loaded into memory whenever possible and similarly do not merely adopt the automatic spill-over approach described above, e.g., where application programmers cannot influence the memory strategy of a business or other application.

Instead, certain example embodiments involve allowing specific, configurable, data fields to be "pinned" to transitory or non-transitory (e.g., RAM or SSD) computer readable storage media. In this regard, there is no swapping or spill over involved once a data field has its "pinned" attribute set—the field either goes to the transitory or to the non-transitory (RAM or SSD) computer readable storage medium, directly and without getting swapped.

One aspect of certain example embodiments relates to the ability to specify which elements, maintained in memory, should be stored to a non-transitory computer readable storage medium (such as, for example, an SSD device or the like), instead of a more transitory computer readable storage medium like RAM or hardware cache as would be conventionally attempted. This configuration may be accomplished at various levels, beginning with the lowest element level, in certain example embodiments.

Another aspect of certain example embodiments relates to a real-time memory manager that enables certain elements to be "pinned" to a non-transitory computer readable storage medium, even when they are used in computer processor operations. The memory manager of certain example embodiments may, for instance, help "sync-up" data stored in the in-memory system with that stored to the non-transitory computer readable storage medium environment, e.g., making where the data is coming from more transparent to the application operating on it.

Another aspect of certain example embodiments relates to enabling application programmers (e.g., business application programmers who implement business logic) to more actively make use of SSD devices and/or other non-transitory computer readable storage media as opposed to RAM for purposes other than longer-term persistence of data. Application programmers can in certain example instances thus allow data that does not have the same latency requirements as data kept in RAM to be kept in an SSD device or the like, thereby lowering the overall cost of the deployment in a manner that is safe. In this latter regard, although requiring an application to go to a slower storage tier for data might, from a general performance perspective, be regarded as more risky than the conventional approaches described above, application programmers are likely to have detailed knowledge about how data is used and, thus, what data can be pinned where, in a manner that is beneficial (or at least neutral) from a performance perspective and advantageous from one or more other perspective (such as cost, ease of implementation, etc.).

Still another aspect of certain example embodiments relates to providing flexibility in how the pinning can be performed. For instance, "fixed rules" may be applied, queries may be run, learning algorithms may be employed, etc., e.g., in pinning/unpinning entire data caches and/or parts thereof to/from a particular storage medium. Still further, certain example embodiments include an API, through which an application and/or application programmer can manipulate pinning flags, even at runtime. This approach is flexible and can be dynamic, as well.

In certain example embodiments, there is provided a computer system comprising at least one processor, a non-transitory computer readable storage medium, and a transitory computer readable storage medium. A memory manager, in cooperation with the at least one processor, is configured to receive requests to store and retrieve data in connection with execution of an application, and for each said received request: determine whether the data associated with the respective received request is part of a data cache that is pinned to the non-transitory computer readable storage medium; in response to a determination that the data associated with the respective received request is part of a data cache that is pinned to the non-transitory computer readable storage medium, handle the respective received request using the non-transitory computer readable storage medium rather than the transitory computer readable storage medium; determine whether the data associated with the respective received request itself is pinned to the non-transitory computer readable storage medium; in response to a determination that the data associated with the respective received request itself is pinned to the non-transitory computer readable storage medium, handle the respective received request using the non-transitory computer readable storage medium rather than the transitory computer readable storage medium; and in response to determinations that the data associated with the respective received request is not part of a data cache that is pinned to the non-transitory computer readable storage medium and that the data associated with the respective received request itself is not pinned to the non-transitory computer readable storage medium, (a) determine which one of the non-transitory computer readable storage medium and the transitory computer readable storage medium should be used in handling the respective received request, and (b) handle the respective received request in accordance with the determination made in (a).

In certain example embodiments, there is provided a method of managing memory in a computer system including at least one processor, a non-transitory computer readable storage medium, and a transitory computer readable storage medium. Requests to store and retrieve data in connection with execution of an application are received. For each said received request: in response to a determination that the data associated with the respective received request is part of a data cache that is pinned to the non-transitory computer readable storage medium, the respective received request is handled using the at least one processor and the non-transitory computer readable storage medium rather than the transitory computer readable storage medium; in response to a determination that the data associated with the respective received request itself is pinned to the non-transitory computer readable storage medium, the respective received request is handled using the at least one processor and the non-transitory computer readable storage medium rather than the transitory computer readable storage medium; and in response to determinations that the data associated with the respective received request is not part of a data cache that is pinned to the non-transitory computer readable storage medium and that the data associated with the respective received request itself is not pinned to the non-transitory computer readable storage medium, (a) a determination is made as to which one of the non-transitory computer readable storage medium and the transitory computer readable storage medium should be used in handling the respective received request, and (b) the respective received request is handled in accordance with the determination made in (a).

In certain example embodiments, there is provided a method of managing memory in a computer system that is configured to execute an application and that includes at least one processor, a non-transitory computer readable storage medium, and a transitory computer readable storage medium. Instructions to force at least one identified data element and/or cache of data elements to be stored to, and searched for in, the non-transitory computer readable storage medium during application execution, is/are received. The received instructions are instrumental in preventing any data elements and/or caches of data elements associated therewith from being moved between the non-transitory computer readable storage medium and the transitory computer readable storage medium during application execution.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS

Certain example embodiments described herein relate to systems and/or methods that enable users to "pin" elements to a particular storage tier (e.g., RAM, SSD, or the like) such that, once pinned, such elements are not moved from one tier to another during application execution. The pinning in certain example embodiments may be pre-determined by using fixed rules and/or may make use of more adaptive queries that could potentially learn over time. Strategies in accordance with the former approach could include, for example, "pin X field to SSD if creation data is YY years old", pin the X least recently used (LRU) data records to SSD, pin the X least frequently used (LFU) data records to SSD, always pin X fields to SSD, etc. Strategies in accordance with the latter approach could be algorithmically defined, implemented as SQL queries, and/or the like, e.g., to perform more complicated calculations to decide on what data can be pinned. The approach taken by certain example embodiments therefore does not rely exclusively on an automatic swapping process by which data is accessed from disk once memory is full, and could leave certain performance constraints to the application programmer, either directly or indirectly. And because the application programmer is likely to have a deeper knowledge of the data fields and how they will be accessed in the application, pinning can be performed more safely and advantageously. As will be appreciated from this description, certain example embodiments enable pinning to be performed at the lowest element level, e.g., via a configuration file or the like, which advantageously enables better utilization of RAM and can help in controlling costs of the system. This also advantageously bypasses at least some back-and-forth data movement caused by spill-over handling, as certain data may be more permanently pinned to the non-transitory computer readable storage media.

Figure 1:
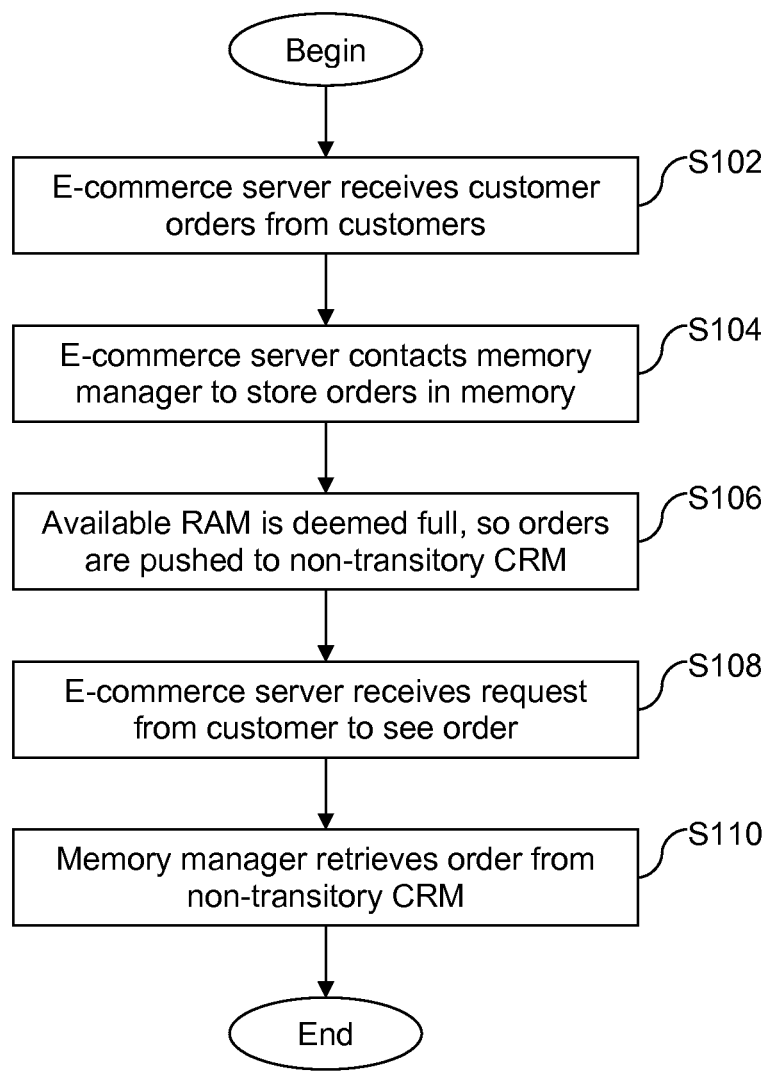
FIG. 1 is a flowchart illustrating the more conventional operations of a current memory manager assisting an e-commerce environment.

FIG. 1 is a flowchart illustrating the more conventional operations of a current memory manager assisting an e-commerce environment, e.g., for background and comparison purposes. As shown in FIG. 1, customer orders are received by the e-commerce server in step S102. In step S104, the e-commerce server contacts the in-memory data management system to store the received orders in memory. Because the available RAM is determined to be full with other data, the orders are pushed to non-transitory computer readable storage media (e.g., SSD drives or the like) in step S106. Although this works from a functional perspective, a performance problem occurs in the event that a customer wants to view orders, e.g., as indicated in step S108 (e.g., to confirm the contents of a shopping cart before checkout, to edit the contents of a cart and continue shopping, etc.). The data now needs to be retrieved from the non-transitory computer readable storage medium in step S110, but that operation takes longer than it otherwise would as the data is stored to disk (for example) with other data that is lower priority and/or accessed less frequently than that which is kept in memory. The customer might become frustrated during the wait time and, if thousands of users are encountering the same issue, the wait time could be more severe, the frequent trips to disk could put it at risk (e.g., from excessive physical operations), etc. It is noted that similar problems might occur on the supplier side, as well, e.g., in connection with order processing, fulfillment, and/or other operations that require data to be read from disk.

The performance issues caused by the operation of a conventional memory manager may be addressed by certain example embodiments, e.g., by allowing the application programmer to configure what data elements should be stored where. For instance, the application programmer could indicate that orders are relatively important and should be pinned to RAM, e.g., so as to help avoid delays in retrieving this comparatively more important information. Additionally, the system does not need to wait for the memory manager to indicate that the RAM is full before beginning to store certain data to the non-transitory computer readable storage media. The system can instead begin storing data to SSDs (for example) right away, based on the configuration.

The approach of certain example embodiments might also lead to better utilization of resources in some instances, as the SSDs might be available but go unused under a conventional approach if the RAM is not filled and a spill-over situation does not arise and, similarly, the RAM might be filled with data that is not used all that often and could even be initially put into an SSD to reserve more space in main memory for more important data. Indeed, because whatever is configured to sit in RAM always stays in RAM and whatever is configured to be in the SSD always stays in the SSD (assuming that there is no dynamic re-configuration, e.g., based on updated queries being executed, higher priority data being accessed, etc., as described in greater detail below), there is no swapping of data between the RAM and the SSD for pinned elements. It also will be appreciated that the application programmer is able to define the configuration at the data element level and, using intimate knowledge of the business, therefore can determine what data elements need better latency and should sit in RAM versus those that could sit in the SSD in a safe manner.

Referring once again to the example shown and described in connection with FIG. 1, an application programmer might realize that customer profile data is not as frequently accessed as customer order data. Thus, it could be advantageous to generate a configuration in which customer profile data is always maintained on SSDs, whereas customer order data is always maintained in-memory, as the system will not end up pushing the latter, more important data to disk. It therefore will be appreciated that certain example embodiments enable a certain data type to be stored to SSDs and, in this example that could include an entire cache of customer profile information. Alternatively, or in addition, certain example embodiments may enable certain data to be stored to SSDs and, in this context that might include specific customer profiles (e.g., based on respective customer identifiers). This functionality can be further extended in certain example embodiments to allow for selected data elements to be pinned to SSDs based on a query, e.g., such that all customer profiles created before 2005 are stored on SSDs (based on the assumption and/or actual data that those customers might not be likely to access the ecommerce environment all that often anymore).

Certain example embodiments thus might be thought of as including three example functions. A first example function involves pinning lower priority data caches to non-transitory computer readable storage media (e.g., SSDs). In the context of the e-commerce illustration above, this function could involve, for example, pinning the customer profile cache to SSDs, as the data therein might not be accessed as frequently as other data (such as, for example, order information, catalog information, etc.). Pinning the customer profile cache to SSDs would free up space in memory for other, higher-priority data. It will be appreciated that although pinned data elements and/or the like may be stored to storage media that are able to persist same, they do not necessarily need to do so in certain example embodiments, e.g., as this functionality is not necessary for the effective replacement of memory that would otherwise be volatile. It will, however, be appreciated that having data persisted on an SSD device might be advantageous in certain instances, e.g., from a recovery perspective, as the data will not necessarily need to be re-loaded, re-generated, or the like, and instead will readily retrievable, even in the event of a power outage, system fault, and/or the like (assuming, for example that pointers to such data or the like can be recovered as well).

A second example function involves pinning lower priority data to non-transitory computer readable storage media (e.g., SSDs) by a more manual configuration. In the context of the e-commerce illustration above, this function could involve, for example, pinning specific customer profiles to SSDs through a more manual configurations. For instance, customer profiles for customers having identifiers 1 through 10,000 (for example) could be pinned to SSDs, as these older customers might no longer be actively using the e-commerce site very often.

A third example function involves pinning lower priority data to non-transitory computer readable storage media (e.g., SSDs) more dynamically and flexibly, e.g., via a query or the like. In the context of the e-commerce illustration above, this function could involve, for example, pinning specific customer profiles to SSDs in response to a query that identifies customers who registered before 2005. who have not purchased anything from the site in more than 1 year, etc. It also will be appreciated that individual data elements could be selected by a query or the like and correspondingly pinned. For instance, gender and hobby fields in a customer profile typically will not change and may not be consulted very often. They therefore might be safely pinned to an SSD in many instances. Such functionality may be performed for individual profiles, across multiple profiles, etc.

Of course, it will be appreciated that other examples are possible, e.g., in terms of the types of data that could be pinned to disk, the queries that could be used to pin specific data to disk, etc., and that this e-commerce illustration is just one example application. It also will be appreciated that for large enterprises that handle millions of customers on a regular basis, saving a few milliseconds on each transaction can result in higher revenues, lower cost, computation time savings, etc.

EXAMPLE IMPLEMENTATION

Illustrative implementation details will now be provided for the three example functions listed above. For the purposes of this example implementation, it is assumed that configuration information is stored in an XML file and that an application programming interface (API) is provided for the application programmer to have access to certain functions relevant to the memory manager. It will be appreciated that these implementation details are illustrative in nature.
Example Implementations for Pinning Data Caches With respect to the functionality associated with pinning a data cache to a transitory (such as, for example, a RAM, hardware cache, etc.) or non-transitory computer readable storage medium (such as, for example, an SSD, HDD, tape, and/or the like), a pinning element may be provided for possible inclusion in the cache configuration file. In this way, entire data caches can be pinned using the pinning element. The pinning element may have as an attribute a store name or identifier that specifies which data tier the data cache should be pinned to. Consider, for example, the following tag provided in a configuration file:
<pinning store="disk"/>

This entry pins the data cache to a location called "disk", e.g., by virtue of being included within a cache element. The "disk" attribute may identify a specific SSD, HDD, and/or the like. The following example snippet specifies that the "CustomerProfile" cache is to be pinned to the "disk" location.
<cache name="CustomerProfile">
  <pinning store="disk"/>
</cache>

The store attribute may specify RAM, L1 cache, L2 cache, and/or the like, e.g., in the event that the application programmer wants to pin the data cache to a transitory computer readable storage medium. For instance, the store attribute may refer to:

The local heap (e.g., using a "localHeap" identifier or the like), such that cache data is pinned to the on-heap memory store. In certain example embodiments, if the local heap is specified, unexpired entries can never be flushed to a lower tier or be evicted. In this regard, these entries may continue to take space in the local heap until they expire or are removed programmatically to free up space in the local heap.

Local memory (e.g., using a "localMemory" identifier or the like), such that cache data is pinned to the memory store or the off-heap store. In certain example embodiments, if the local memory is specified, unexpired entries can never be flushed to a lower tier or be evicted. Off-heap memory in this sense refers to low latency volatile storage that typically is not garbage collected. In the case of a Java implementation, for example, off-heap memory exists outside of the Java heap and is not subject to garbage collection.

Hardware cache (e.g., using an "inCache" identifier or the like), such that cache data is pinned to the hardware cache, which can be any tier in which cache data is stored. The tier may be user specified, chosen automatically (e.g., based on performance-enhancing efficiency algorithms), etc. These algorithms could, for example, push data to the client level hardware cache (also sometimes called L1 cache) if the data is used frequently, to the lower level hardware cache (also sometimes called L2 cache) if the data is not used that frequently, etc. This may work similar to implementing an LRU algorithm or the like.

Similar functionality may be performed more programmatically, e.g., by getting the object reference for the specific data cache and calling a function like:
cache.setPinningStore(DISK);
where "DISK" is a pre-determined value defined in the system, and where the cache object is a high-level construct (e.g., an object in Java or the like) where data can be parked temporarily while being operated on (and potentially before being committed to a database or the like) that the system may use in connection with resource optimizations of the sort disclosed herein.

Additional attributes may be used to trigger other functionality. For instance, additional attributes may be used to specify spill-over locations (if necessary), relative priorities if multiple potentially large data caches are to be stored to a smaller-capacity storage area (e.g., RAM), etc.

The server implementation for cache.put and cache.get may be extended to check for a specified value for "DISK". Before adding data to the data cache, the store element may be checked and, if the element value is set, then the data may be maintained in the specified location. The same is done while retrieving the data from the cache using the "get" operation.
Example Implementations for Pinning Data in Caches With respect to pinning lower priority data by a more manual means, it is noted that specific data can be pinned to non-transitory computer readable storage media (e.g., SSDs) by using API calls, or by using a configuration file or the like. For example, using the high-level cache construct described above, a data element in a cache can be pinned to a disk by calling a function like:
cache.setPinnedToDisk(key, true);

where the key property references the data element to be pinned. It will be appreciated that this function may allow objects represented in binary form or the like to be used as keys.

Similarly, a data element in a cache can be unpinned from the disk by calling the same function with the second parameter being "false." To unpin all of a cache's pinned entries, the following function can be called:
cache.unpinAllFromDisk( );

In some cases, it may be desirable to determine whether an entry in a cache has been pinned to disk. This may be accomplished by calling a function like:
cache.isPinnedToDisk(key);
which could return a Boolean value, with "true" indicating that the entry with the passed key is pinned to disk and with the "false" indicating that that entry is not pinned to disk.

In certain example embodiments, some or all of the example functions described above may be extended to specify a particular non-transitory computer readable storage medium to which the data should be pinned. This may be accomplished, for example, by passing to the setPinnedToDisk function an additional identifier that is indicative of the particular storage medium to use. Similarly, the isPinnedToDisk function may be extended to return the identifier of the particular storage medium to which the data with the key is pinned, and null, −1. or some other appropriate flag, if it is not pinned anywhere. In certain example embodiments, an ordered list of storage media may be provided in the event data needs to spill over into additional tiers.

In certain example embodiments, analogous functions may be provided so that data may be stored to more transitory computer readable storage media. Such functions may include, for example:
cache.setPinnedToMemory(key, [true|false]);
cache.unpinAllFromMemory( );
cache.isPinnedToMemory(key);

As above, these functions may be extended to allow for the specification of particular transitory computer readable storage media to which data should be pinned, to return an identifier of a transitory computer readable storage medium to which data is pinned (if valid, and a flag if not valid), to provide an ordered list of storage media may be provided in the event data needs to spill over into additional tiers, etc. For instance, certain example embodiments may pin data to RAM, L1 cache, L2 cache, and/or the like. Similarly, certain example embodiments may pin data the RAM of a local machine, the RAM of a particular node in a distributed computing environment, etc.

The above-described and/or other functionality may be achieved by configuration, as well. For instance, a comma-separated list of keys to be pinned to disk can be provided. The following code snippet pins data with keys 11. "Robert", 13J, and 57JOE in the CustomerProfile cache to disk:

```
<cache name="CustomerProfile">
    <pintodisk keys=11. "Robert", 13J, 57JOE/>
</cache>
```

Similar to the above, the server implementation for cache.put and cache.get may be extended to check for internal "pinnedToDisk" flags or the like before putting or retrieving data for a specific element key.

Example Implementations for Pinning Data in Caches Based on Queries

With respect to pinning lower priority data by a more automatic means, it is noted that specific data can be pinned to non-transitory computer readable storage media (e.g., SSDs) by using API calls, or by using a configuration file or the like, that specify queries. These queries can, for example, selectively filter out data elements that should be pinned. The following code snippet implements a SQL query that identifies names from the CustomerProfile cache that start with the letter "J", and the tags indicate that the retrieved records are to be pinned to disk:

```
<cache name="CustomerProfile">
    <pintodisk>
        //specifies that we are searching on name
        <searchAttribute name="name" type="String"
          expression="value.getName( )"/>
        //provides the query expression for selecting a subset of
        //names starting with "J" from the cache
        <queryexpression>Select * from CustomerProfile where name
        like
            'J*'</queryexpression>
    </pintodisk>
</cache>
```

As the cache loads and/or is loaded up (e.g., initially, as data is added during application execution, etc.), a query manager may execute the query expression and maintain the elements selected by the query on disk. It will be appreciated that the same or similar functionality can be achieved programmatically by running the query and pushing the selected elements to disk.

The features described in this section may work just like pinning specific elements or keys to disk. For instance, once a set of elements matches the query and is pinned to disk, the internal attribute "pinnedToDisk" is set to true for all of these elements. The server implementation for cache.put and cache.get may be extended to check for a flag for "pinnedToDisk" before putting or retrieving data for a specific element key.

In certain example embodiments, rather than determining individual keys, groups of key, specific fields, and/or the like, that are to be pinned to particular media, certain example embodiments may additionally or alternatively use queries to determine that entire caches should be pinned to particular media. Still further, certain example embodiments may use queries or the like to select the medium to which the data is to be stored, selecting between, for example, non-transitory and transitory media, particular types of non-transitory or transitory media (e.g., SSD vs. HDD or L1 cache vs. RAM), etc., based on factors such as, for example, expected or actual medium performance and/or loads, total or free capacity, number of assignments, etc.

Example Implementation for Setting Computer Readable Storage Medium Size

Certain example embodiments may specify the size of some or all of the computer readable storage media that are available. This may involve, for example, inferentially or explicitly declaring the non-transitory and/or transitory media that can be used, the total sizes, and/or the maximum sizes that can be used. In this regard, the following code snippet is an example that specifies, at the server level, that there is a total storage capacity of 800 gigabytes that should be split between off-heap RAM and disk. It can be seen from this example that because the total and RAM capacities are set, the remainder is reserved for disk.

```
<servers>
    . . .
    <server host="hostname" name="server1">
```

```
    ...
    //specifies a total storage of 800gb
    <dataStorage size="800g">
        //specifies a RAM storage of 200gb
        <offheap size="200g"/>
        //600gb is automatically assigned to disk
        <hybrid />
    </dataStorage>
</server>
</servers>
```

Figure 2:
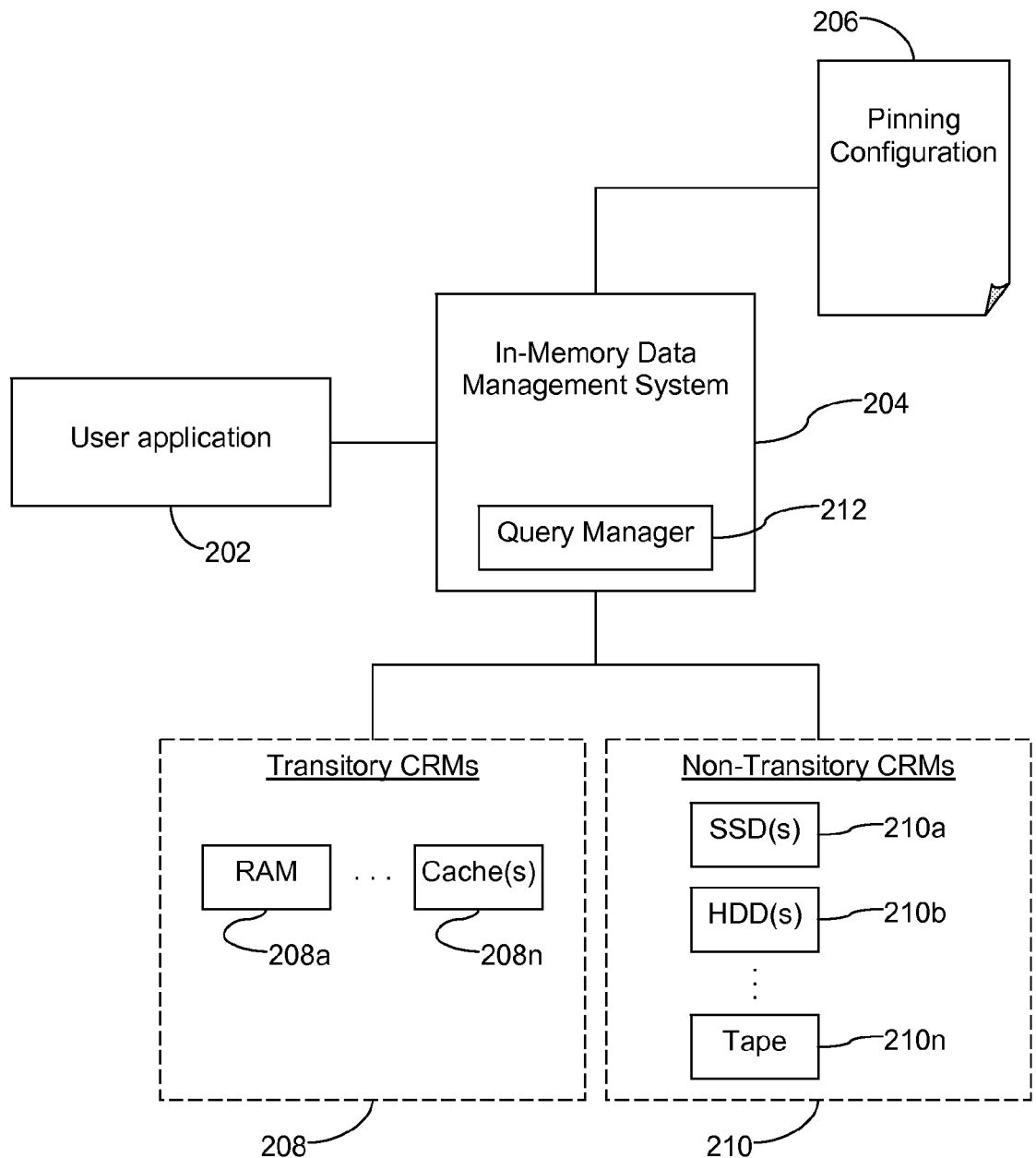
FIG. 2 is a block diagram showing certain components of computer system that makes use of the memory management techniques of certain example embodiments.

FIG. 2 is a block diagram showing certain components of computer system that makes use of the memory management techniques of certain example embodiments. It will be appreciated that the FIG. 2 computer system includes processing resources including at least one processor, and may be implemented as a server programmed and/or otherwise configured to handle any number of applications (such as, for example, the e-commerce example discussed above). A user application 202 interfaces with the in-memory data management system 204, e.g., when data needs to be retrieved and/or stored. During user application 202 startup, the in-memory data management system 204 consults the pinning configuration 206, which may be stored to a non-transitory computer readable storage medium and/or loaded in memory. As indicated above, the pinning configuration 206 may be saved in XML format and may specify (a) caches to be pinned to particular media, (b) keys to data from caches to be pinned to particular media, and/or (c) queries to be used in determining keys and/or caches to be pinned to particular media. The media may be a transitory computer readable storage medium 208 (such as, for example, RAM 208a, hardware cache 208n. etc.) or a non-transitory computer readable storage medium 210 (e.g., SSD 210a. HDD 210b. tape 210n. etc.).

Data is processed (e.g., stored and/or retrieved) as a result of the usage of the user application 202. In this regard, the in-memory data management system 204 consults the pinning configuration 206 and determines where data should be stored (e.g., to a transitory computer readable storage medium 208 and/or to a non-transitory computer readable storage medium 210). If there are no pins specified, then the in-memory data management system 204 may process the data as usual.

The query manager 212 is a runtime component that helps execute queries that are specified in the pinning configuration 206 and/or that are programmatically defined (in the sense that they are defined within the user application 102 or a component thereof). In this sense, the query manager 212 may be thought of in some implementations as being an administration and access component of the in-memory data management system 204.

As indicated above, this configuration may be accomplished at various levels, beginning with the lowest element level, in certain example embodiments. In certain example embodiments, data may be stored as a key/value pair, and this key/value pair may be considered an element and, thus, pinning may occur using the example implementation details as those set forth above.

Figure 3:
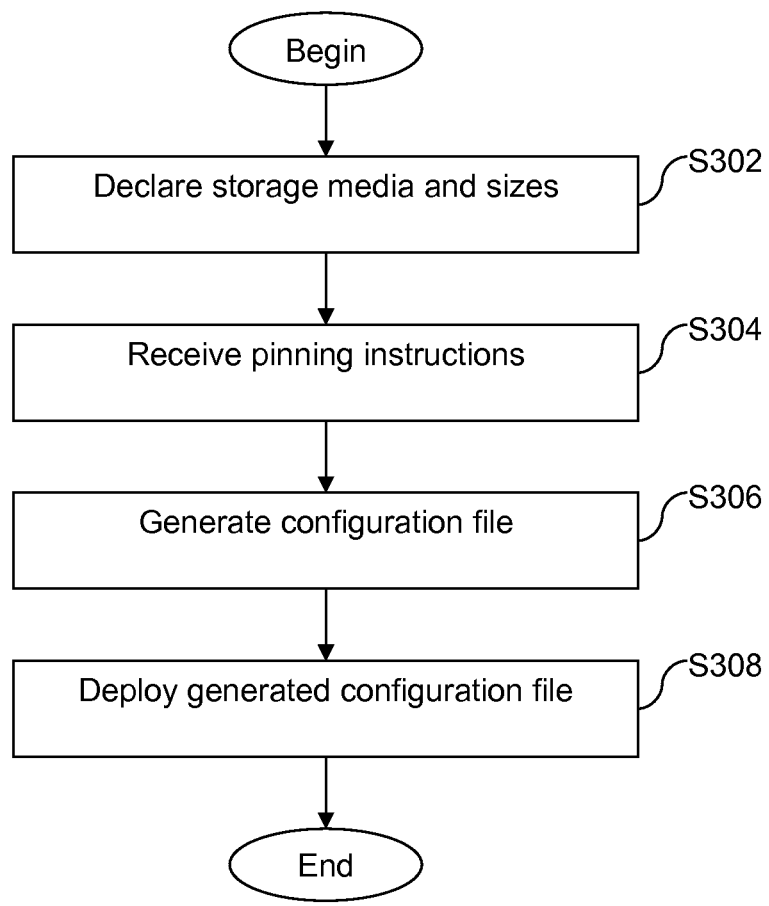
FIG. 3 is a flowchart showing certain example design time configuration activities in accordance with certain example embodiments.

FIG. 3 is a flowchart showing certain example design time configuration activities in accordance with certain example embodiments. As shown in FIG. 3, the storage media that the application may use is identified in step S302, and the sizes that are usable in connection with memory or memory-like operations may be defined. Pinning instructions are received in step S304. Such instructions may be received by processing program logic that makes use of APIs to specify data caches and/or parts thereof (e.g., down to the data element level in certain example embodiments), by more direct configuration input, and/or the like. The indications may be provided by directly reference, by programmatic reference, through queries, etc. Using this information, a configuration file is generated in step S306, and the configuration file is deployed in step S308. The deploying may involve the creation of an XML file, e.g., storable as pinning configuration 206 and made accessible to the in-memory data management system 204 and/or user application 102. The deploying may alternatively or in addition involve deployment of the user application 102 itself, as pinning information may be stored therein, e.g., as API calls, references, and/or the like.

Figure 4:
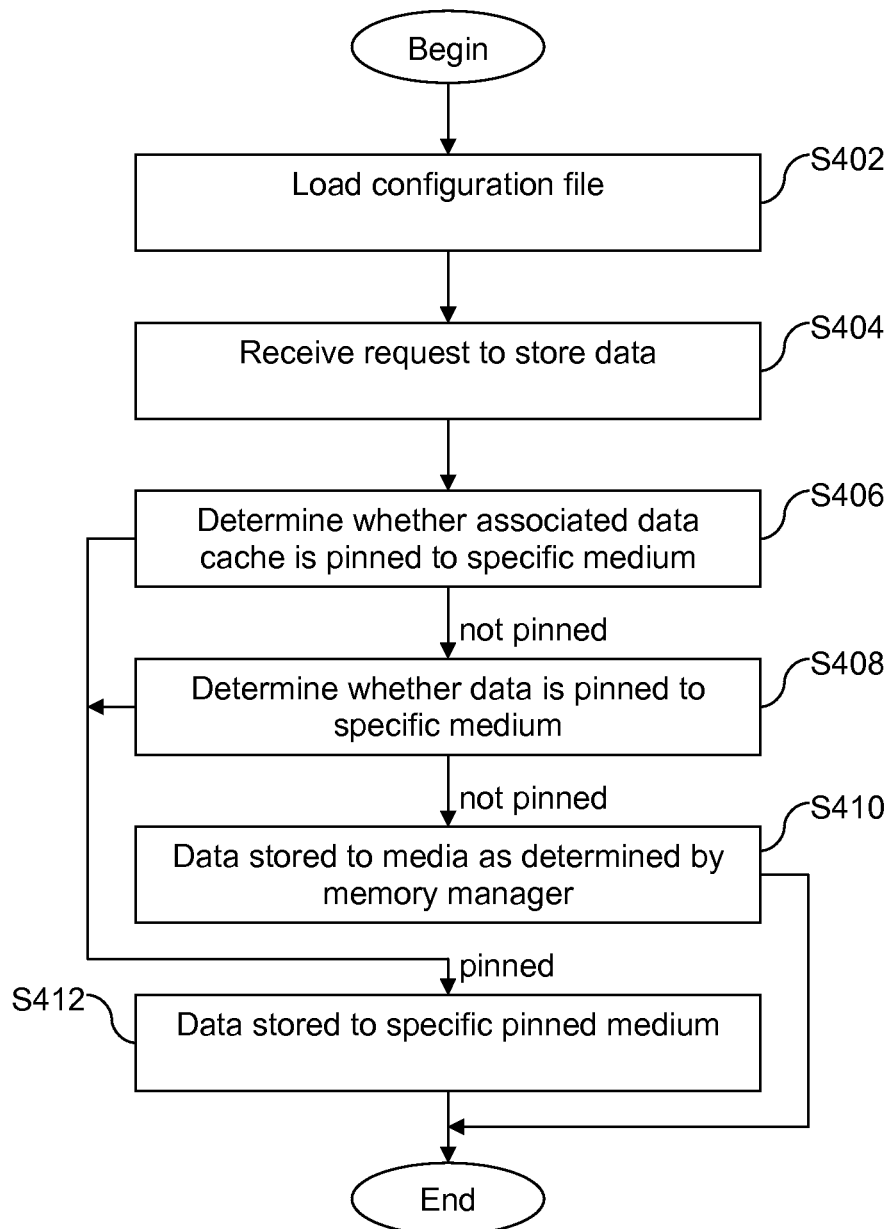
FIG. 4 is a flowchart showing certain example runtime activities in accordance with certain example embodiments.

FIG. 4 is a flowchart showing certain example runtime activities in accordance with certain example embodiments. In step S402, the configuration file is generated and read, e.g., when the application is initialized. This informs the memory manager of available storage locations and data elements, etc., to be pinned. A request to store data is received from the application in step S404. A determination is made in step S406 as to whether the data cache associated with the data is pinned to a specific medium. If it is not, a determination is made in step S408 as to whether the specific data is pinned to a specific medium. Such checks may be performed by consulting the information in the configuration file, by executing API calls such as those described above, etc. If both determinations indicate that there is no pinning, then data is stored to the media in step S410 in a manner determined to be appropriate by the memory manager. However, if pinning determinations are made in either step S408 or step S410, then the data is stored to the specific medium.

It will be appreciated that tasks similar to those described above in connection with FIG. 4 may be performed in connection with data access operations. In both cases, the configuration may be altered dynamically at runtime, e.g., by virtue of API calls from the application, different query results being returned, etc.

In view of the foregoing, it will be appreciated that certain example embodiments put the power of memory usage optimization in the hands of the application and/or application programmers, rather than leaving such optimizations up to the environment. This reverses the assumption that all data should be loaded into RAM before being operated on and instead involves the realization that an application and/or application programmer might know best or be able to learn what data is needed most often, most recently, most urgently, etc.

Although certain example storage media have been described, it will be appreciated that others may be used in place of or in addition to these examples. These storage media types may be regarded by those skilled in the art as being fast (e.g., as in the case of RAM) or slow (e.g., as in the case HDDs), and others may be regarded as being somewhere in between (e.g., SSDs, flash memory, etc.). These storage media types alternatively or additionally may be regarded by those skilled in the art as being transitory (e.g., as in the case of RAM) or non-transitory (e.g., as in the case of SSDs, HDDs, etc.), as alluded to above. These media types also may be characterized as volatile or non-volatile, generally following the indications of transitory and non-transitory, respectively, as set forth above.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system, comprising:
   at least one processor;
   a non-volatile computer readable storage medium;
   a volatile computer readable storage medium; and
   a memory manager that, in cooperation with the at least one processor, is configured to receive requests to store and retrieve data in connection with execution of an application, and for each said received request:
      determine whether the data associated with the respective received request is part of a data cache that is pinned to the non-volatile computer readable storage medium,
   in response to a determination that the data associated with the respective received request is part of a data cache that is pinned to the non-volatile computer readable storage medium, handle the respective received request using the non-volatile computer readable storage medium rather than the volatile computer readable storage medium,
      determine whether the data associated with the respective received request itself is pinned to the non-volatile computer readable storage medium,
   in response to a determination that the data associated with the respective received request itself is pinned to the non-volatile computer readable storage medium, handle the respective received request using the non-volatile computer readable storage medium rather than the volatile computer readable storage medium, and
   in response to determinations that the data associated with the respective received request is not part of a data cache that is pinned to the non-volatile computer readable storage medium and that the data associated with the respective received request itself is not pinned to the non-volatile computer readable storage medium, (a) determine which one of the non-volatile computer readable storage medium and the volatile computer readable storage medium should be used in handling the respective received request, and (b) handle the respective received request in accordance with the determination made in (a).

2. The system of claim 1, wherein the non-volatile computer readable storage medium is a solid state device (SSD) drive and the volatile computer readable storage medium is random access memory (RAM).

3. The system of claim 1, further comprising a configuration file that is consultable in determining whether data associated with received requests is part of a data cache that is pinned to the non-volatile computer readable storage medium and whether data associated with received requests itself is pinned to the non-volatile computer readable storage medium.

4. The system of claim 3, wherein the configuration file further identifies the non-volatile computer readable storage medium and/or the volatile computer readable storage medium.

5. The system of claim 4, wherein the configuration file further identifies a capacity of the non-volatile computer readable storage medium and/or the volatile computer readable storage medium usable in pinning.

6. The system of claim 3, further comprising a query manager configured to execute pre-programmed queries in determining whether data associated with received requests is part of a data cache that is pinned to the non-volatile computer readable storage medium and whether data associated with received requests itself is pinned to the non-volatile computer readable storage medium.

7. The system of claim 3, wherein the memory manager is further configured to receive and execute application programming interface (API) calls in determining whether data associated with received requests is part of a data cache that is pinned to the non-volatile computer readable storage medium and whether data associated with received requests itself is pinned to the non-volatile computer readable storage medium.

8. The system of claim 1, wherein the memory manager is further configured to receive and execute application programming interface (API) calls from the application in determining whether data associated with received requests is part of a data cache that is pinned to the non-volatile computer readable storage medium and whether data associated with received requests itself is pinned to the non-volatile computer readable storage medium.

9. The system of claim 8, further comprising a query manager configured to execute pre-programmed queries in determining whether data associated with received requests is part of a data cache that is pinned to the non-volatile computer readable storage medium and whether data associated with received requests itself is pinned to the non-volatile computer readable storage medium.

10. The system of claim 1, further comprising a query manager configured to execute pre-programmed queries in determining whether data associated with received requests is part of a data cache that is pinned to the non-volatile computer readable storage medium and whether data associated with received requests itself is pinned to the non-volatile computer readable storage medium.

11. The system of claim 10, wherein the queries are SQL queries.

12. The system of claim 1, wherein indications as to whether data elements and/or data caches are pinned to the non-volatile computer readable storage medium are updatable during application execution.

13. The system of claim 12, wherein the indications are updatable during application execution via changes committed to a configuration file that is consultable in determining whether data associated with received requests is part of a data cache that is pinned to the non-volatile computer readable storage medium and whether data associated with received requests itself is pinned to the non-volatile computer readable storage medium, via application programming interface (API) calls from the application, and/or via queries that are run.

14. The system of claim 1, wherein elements are storable in memory as <key, value>pairs, and individual elements are pinnable to the non-volatile computer readable storage medium.

15. A method of managing memory in a computer system including at least one processor, a non-volatile computer readable storage medium, and a volatile computer readable storage medium, the method comprising:
receiving requests to store and retrieve data in connection with execution of an application; and
for each said received request:
in response to a determination that the data associated with the respective received request is part of a data cache that is pinned to the non-volatile computer readable storage medium, handling the respective received request using the at least one processor and the non-volatile computer readable storage medium rather than the volatile computer readable storage medium,
in response to a determination that the data associated with the respective received request itself is pinned to the non-volatile computer readable storage medium, handling the respective received request using the at least one processor and the non-volatile computer readable storage medium rather than the volatile computer readable storage medium, and
in response to determinations that the data associated with the respective received request is not part of a data cache that is pinned to the non-volatile computer readable storage medium and that the data associated with the respective received request itself is not pinned to the non-volatile computer readable storage medium, (a) determining which one of the non-volatile computer readable storage medium and the volatile computer readable storage medium should be used in handling the respective received request, and (b) handling the respective received request in accordance with the determination made in (a).

16. The method of claim 15, wherein the non-volatile computer readable storage medium is a solid state device (SSD) drive and the volatile computer readable storage medium is random access memory (RAM).

17. The method of claim 15, further comprising consulting a configuration file in determining whether data associated with received requests is part of a data cache that is pinned to the non-volatile computer readable storage medium and whether data associated with received requests itself is pinned to the non-volatile computer readable storage medium.

18. The method of claim 15, further comprising receiving and executing application programming interface (API) calls from the application in determining whether data associated with received requests is part of a data cache that is pinned to the non-volatile computer readable storage medium and whether data associated with received requests itself is pinned to the non-volatile computer readable storage medium.

19. The method of claim 15, further comprising executing pre-programmed queries in determining whether data associated with received requests is part of a data cache that is pinned to the non-volatile computer readable storage medium and whether data associated with received requests itself is pinned to the non-volatile computer readable storage medium.

20. The method of claim 15, further comprising updating an indication as to whether an identified data element and/or an identified data cache is pinned to the non-volatile computer readable storage medium, during application execution.

21. The method of claim 20, wherein the updating is performed in response to a change committed to a configuration file that is consultable in determining whether data associated with received requests is part of a data cache that is pinned to the non-volatile computer readable storage medium and whether data associated with received requests itself is pinned to the non-volatile computer readable storage medium, via an application programming interface (API) call from the application, and/or via a query that is run.

22. The method of claim 15, wherein elements are storable in memory as <key, value>pairs, and individual elements are pinnable to the non-volatile computer readable storage medium.

23. The method of claim 15, further comprising allowing spill-over from the volatile computer readable storage medium to the non-volatile computer readable storage medium only for data that is not pinned, directly or indirectly, to the volatile computer readable storage medium.

24. The method of claim 15, further comprising overriding computer instructions to store data to, or search for data in, volatile memory for data that is pinned, directly or indirectly, to the volatile computer readable storage medium.

25. A non-transitory computer readable storage medium tangibly storing a program comprising instructions that, when executed, perform the method of claim 15.

* * * * *